US012784202B2

(12) United States Patent
Helaoui et al.

(10) Patent No.: US 12,784,202 B2
(45) Date of Patent: Nov. 3, 2026

(54) NON-INVASIVE PERIODONTAL EXAMINATION

(71) Applicant: KONINKLIJKE PHILIPS N.V., Eindhoven (NL)

(72) Inventors: Rim Helaoui, Eindhoven (NL); Lutz Christian Gerhardt, Eindhoven (NL); Amir Hussein Rmaile, Eindhoven (NL); Mark Thomas Johnson, Arendonk (BE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 221 days.

(21) Appl. No.: 18/572,704

(22) PCT Filed: Jun. 10, 2022

(86) PCT No.: PCT/EP2022/065852
§ 371 (c)(1),
(2) Date: Dec. 20, 2023

(87) PCT Pub. No.: WO2023/274690
PCT Pub. Date: Jan. 5, 2023

(65) Prior Publication Data
US 2024/0296558 A1 Sep. 5, 2024

(30) Foreign Application Priority Data
Jun. 29, 2021 (EP) .................................... 21182405

(51) Int. Cl.
*G06T 7/00* (2017.01)
*G06T 7/62* (2017.01)

(52) U.S. Cl.
CPC .............. *G06T 7/0012* (2013.01); *G06T 7/62* (2017.01); *G06T 2207/10116* (2013.01); *G06T 2207/20081* (2013.01); *G06T 2207/30036* (2013.01)

(58) Field of Classification Search
None
See application file for complete search history.

(56) References Cited

U.S. PATENT DOCUMENTS 10,335,098 B2 7/2019 Shibasaki et al.
2008/0305458 A1 12/2008 Lemchen
(Continued)

FOREIGN PATENT DOCUMENTS

EP 2452652 * 5/2012 ............... A61B 6/03
EP 2452652 A1 5/2012
(Continued)

OTHER PUBLICATIONS

Birkfellner et al., "Multi-Modality Imaging: A Software Fusion and Image-Guided Therapy Perspective", Frontiers in Physics, vol. 6, (Jul. 2018), pp. 1-12.
(Continued)

*Primary Examiner* — Beniyam Menberu

(57) ABSTRACT

A method for performing a non-invasive periodontal examination on a subject. The method comprises obtaining a first optical image of the surface of an intra-oral area of the subject, the intra-oral area containing at least one tooth and a corresponding gum and obtaining a second image of the intra-oral area of the subject, wherein the second image contains an image of the hard tissue covered by the soft tissue. The hard tissue includes bone and teeth. The method further comprises merging the optical image and the second image into a fused image such that the tooth and part of the gum in the fused image are based on the optical image and wherein any bone in the fused image is based on the second
(Continued)

image and estimating the periodontal distance between a soft tissue landmark and a hard tissue landmark for each tooth in the intra-oral area based on the fused image.

13 Claims, 2 Drawing Sheets

(56) References Cited

U.S. PATENT DOCUMENTS

| | | | | |
|---|---|---|---|---|
| 2015/0348320 | A1* | 12/2015 | Pesach | G06T 7/0014 382/128 |
| 2018/0078347 | A1* | 3/2018 | Falkel | A61B 1/24 |
| 2020/0364860 | A1 | 11/2020 | Kearney et al. | |
| 2023/0117097 | A1* | 4/2023 | Yoshihashi | A61C 9/0053 433/24 |

FOREIGN PATENT DOCUMENTS

| | | | | |
|---|---|---|---|---|
| JP | 2019063040 | * | 4/2019 | A61B 6/51 |
| JP | 2019063040 | A | 4/2019 | |
| WO | 2006105476 | A2 | 10/2006 | |

OTHER PUBLICATIONS

Chifor et al., "Periodontal evaluation using a non-invasive imaging method (ultrasonography)", Medicine and Pharmacy Reports (2019) vol. 92, Supplement No. 3, pp. S20-S32.

Lang et al., "Gingivitis as a risk factor in periodontal disease", Journal of Clinical Periodontology, vol. 36 Issue s10, pp. 3-8, (2009).

https://www.periodontal-health.com/diagnosis/, downloaded Sep. 6, 2024.

Nguyen et al., "Alveolar Bone Segmentation in Intraoral Ultrasonographs with Machine Learning", Journal of Dental Research, vol. 99 Issue 9, pp. 1054-1061, (2020).

Fageeh et al., "The accuracy and reliability of digital measurements of gingival recession versus conventional methods", BMC Oral Health, vol. 19 Issue 1, p. 154, (2019).

https://pocketdentistry.com/disease-entities-and-diagnosis/, downloaded Sep. 6, 2024.

Ko et al., "The Chairside Periodontal Diagnostic Toolkit: Past, Present, and Future", Diagnostics 2021, vol. 11, 932, pp. 1-23.

* cited by examiner

NON-INVASIVE PERIODONTAL EXAMINATION

This application is the U.S. National Phase application under 35 U.S.C. § 371 of International Application No. PCT/EP2022/065852, filed on Jun. 10, 2022, which claims the benefit of EP Application Serial No. 21182405.7, Filed Jun. 29, 2021. These applications are hereby incorporated by reference herein.

FIELD OF THE INVENTION

The current invention relates to dental health. In particular, the invention relates to periodontal examinations.

BACKGROUND OF THE INVENTION

Periodontal disease and gingival bleeding are highly prevalent in the adult population worldwide. In order to diagnose gingivitis/periodontitis, dentists typically perform a basic periodontal examination (BPE), a common dental procedure that aims at differentiating between healthy and diseased periodontium.

During BPE, every tooth must be assessed individually. For probing with a graduated periodontal probe (with markings at 3, 6, 8, and 11 mm), a slight force of 0.25 N (25 g) should be applied. The tip of the probe (diameter 0.5 mm) is inserted gently along the axis of the tooth into the gingival sulcus. The probing depth is read from the markings on the probe.

Four or six sites are typically examined at every tooth. Note that, during common periodontal procedures, the diagnosis of periodontitis can be definitely confirmed by imaging of the jaw bone, for example using X-rays or other imaging modalities that can acquire hard tissue information (e.g. ultrasound). The selection of the X-rays necessary to diagnose periodontitis can only be made after the clinical examination.

Traditional periodontal probing requires in-clinic or in-office invasive procedures. They are time-consuming and mostly associated with a painful patient experience. Recent alternative methods rely on 3D ultrasonic imaging as an alternative given that it shows both soft and hard tissue. However, these images are usually challenging to interpret and might require data-trained algorithms to support the interpretation. Thus, there is a need for an improved method of performing periodontal examinations.

JP 2019063040 discloses a method for superimposing visible images on X-ray images.

KO TAE-JUN ET AL: "The Chairside Periodontal Diagnostic Toolkit: Past, Present, and Future.", DIAGNOSTICS (BASEL, SWITZERLAND) 22 May 2021, vol. 11, no. 6, 22 May 2021 (2021-05-22), ISSN: 2075-4418 discloses a review of the toolkits available for diagnosing periodontal diseases.

SUMMARY OF THE INVENTION

The invention is defined by the claims.

According to examples in accordance with an aspect of the invention, there is provided a method for performing a non-invasive periodontal examination on a subject, the method comprising:

obtaining a first optical image of the surface of an intra-oral area of the subject, the intra-oral area containing at least one tooth and a corresponding gum;

obtaining a second image of the intra-oral area of the subject, wherein the second image contains an image of the hard tissue covered (i.e. obscured) by the soft tissue and wherein the hard tissue includes bone and teeth;

merging the optical image and the second image into a fused image such that a soft tissue landmark in the fused image is based on the optical image and a hard tissue landmark is based on the second image; and estimating the periodontal distance between the soft tissue landmark and the hard tissue landmark for each tooth in the intra-oral area.

The intra-oral area (of which images are taken) is for example a portion of the oral cavity of the subject. Periodontal examinations are based on measuring the distance (i.e. the periodontal distance) between the end of the gum against a tooth surface (i.e. the soft tissue landmark) and the end of the bone covered by the gum (i.e. the hard tissue landmark). For example, the tooth surface may be a proximal tooth surface, a buccal tooth surface or a lingual tooth surface. As the bone is covered by the gum, visual examination is not possible and thus probing is typically required to measure the distance. However, probing can be painful and uncomfortable for the subject. The term "covered by the soft tissue landmark" may also be referred to as "occluded by the soft tissue landmark"

The inventors realized that two known imaging techniques can be fused together to show the soft tissue landmark and the hard tissue landmark simultaneously. The first imaging technique obtains an optical image of the surface of the intra-oral area. In other words, the optical image could be an image which can visually display the surface of the teeth and the corresponding gum.

The second imaging technique may be, for example, x-ray imaging or ultrasound imaging. The second image is obtained of the intra-oral area as x-ray and ultrasound imaging, for example, are capable of imaging the bone and tooth covered by the gum. Thus, both the optical image and the second image are fused/merged such that part of the fused image is shown as the optical image and the other part is shown as the second image. Various methods exist for merging images of the same area and will be described in detail below.

The fused image thus allows the simultaneous identification of the soft tissue landmark and the hard tissue landmark with one image, which further enables the estimation of the periodontal distance without the need for probing.

The method may further comprise inferring the periodontal distance between a first soft tissue landmark and a first hard tissue landmark based on at least two different estimated periodontal distances and population data, wherein the optical image does not contain the first soft tissue landmark and/or the first hard tissue landmark and wherein the population data contains pre-measured patterns of periodontal distances for groups of teeth.

Population data includes, for example, a set of six periodontal distances for a plurality of subjects. The intra-oral area may not be large enough (e.g. a field of view of a camera taking the optical image may be small) to obtain images of these six teeth and estimate six periodontal distances. Thus, the inventors propose inferring the periodontal distances for teeth which are not shown (or not fully shown) in the intra-oral area based on patterns of the estimated periodontal distances taken for specific sets of teeth.

The method may further comprise determining/obtaining the hard tissue landmark based on at least one pixel in the fused image where a tooth and bone meet.

Determining the hard tissue landmark may be based on segmenting the hard tissue from the second image thereby generating a hard tissue segmentation line and identifying a sudden change in the gradient of the hard tissue segmentation line, wherein the hard tissue landmark is based on the point where the sudden change in gradient occurs.

Alternatively, obtaining the hard tissue landmark may be based on receiving the position of the hard tissue landmark from a user interface (e.g. dash board) or inputting the fused image and/or second image into a machine learning algorithm trained to identify the hard tissue landmark.

For example, the machine learning algorithm may be trained by receiving the position of the hard tissue landmark from a user interface. A dentist may train the machine learning algorithm while performing a non-invasive determination of pocket depth by clicking on pixels or intersection of a digital grid imposed onto the fused image.

The method may further comprise determining/obtaining the soft tissue landmark based on at least one pixels in the fused image where a tooth and gum meet.

Determining the soft tissue landmark may be based on segmenting the hard tissue from the second image thereby generating a hard tissue segmentation line, segmenting the teeth and gum from the optical image thereby generating a gum-tooth segmentation line and determining the soft tissue landmark based on where the gum-tooth segmentation line intersects the hard tissue segmentation line.

Alternatively, obtaining the soft tissue landmark may be based on receiving the position of the soft tissue landmark from a user interface or inputting the fused image and/or the optical image into a machine learning algorithm trained (e.g. from receiving the position of the hard tissue landmark from a user interface) to identify the soft tissue landmark.

Merging the optical image and the second image into a fused image may be based on identifying at least two markers in the second image and in the optical image, mapping the x-ray image to the optical image based on the identified markers and combining the second image and the optical image to generate the fused image.

For example, fiducial markers (or length calibrated grids) can be placed on the intra-oral area (visible in the optical image and in the second image) in order to identify corresponding points in the images. Once at least two points have been identified in both the optical image and the second image, they can be mapped onto each other. The second image and the optical image can then be combined (e.g. superimposed) such that the teeth and part of the gums are shown based on the optical image and the rest of the gums are shown based on the second image. Any bone in the intra-oral area is based on the second image. A tooth can but does not need to be comprised in both the first and the second image.

Merging the optical image and the second image into a fused image may be based on determining a first outer geometry of the teeth in the optical image, determining a second outer geometry of the teeth in the second image, mapping the second image or the optical image such that the first outer geometry coincides with the second outer geometry and combining the second image and the optical image to generate the fused image.

The geometry of the teeth can also be used to map the second image to the optical image. Typically the optical image and the second image are taken from the same angle (relative to the intra-oral area) and the geometry of the teeth is identical (or close to identical) for both. Thus, either the second image or the optical image can be translated and/or rotated (i.e. mapped) such that the teeth geometry for both coincide.

The second image may be generated based on a known scale and estimating the periodontal distance between a soft tissue landmark and a hard tissue landmark may be based on the known scale.

For example, obtaining an x-ray image is typically based on standard imaging procedures which contain a known scale (i.e. real distance in the x-ray image). Thus, when the optical image is fused/merged with an x-ray image, the known scale can be used to match scales of the first and the second image, and calibrate and rescale the fused image to the same length scale and image resolution. The known scale can thus be used to measure any calibrated absolute distance in the fused image, including the distance between the soft tissue landmark and the hard tissue landmark (i.e. the periodontal distance).

The method may further comprise superimposing a digital grid onto the fused image, wherein the digital grid is generated based on the known scale and defines absolute length within the fused image.

The invention also provides a computer program product comprising computer program code means which, when executed on a computing device having a processing system, cause the processing system to perform all of the steps of the method for performing a non-invasive periodontal examination on a subject.

The invention also provides a system for performing a non-invasive periodontal examination on a subject, the system comprising a processor configured to:

- obtain a first optical image of the surface of an intra-oral area of the subject, the intra-oral area containing at least one tooth and a corresponding gum;
- obtain a second image of the intra-oral area of the subject, wherein the second image contains an image of the hard tissue covered by the soft tissue and wherein the hard tissue includes bone and teeth;
- merge the optical image and the second image into a fused image such that a soft tissue landmark in the fused image is based on the optical image and a hard tissue landmark is based on the second image;
- estimate the periodontal distance between the soft tissue landmark and the hard tissue landmark for each tooth in the intra-oral area.

The processor may be further configured to infer the periodontal distance between a first soft tissue landmark and a first hard tissue landmark based on at least two different estimated periodontal distances and population data, wherein the optical image does not contain the first soft tissue landmark and/or the first hard tissue landmark and wherein the population data contains pre-measured patterns of periodontal distances for groups of teeth.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
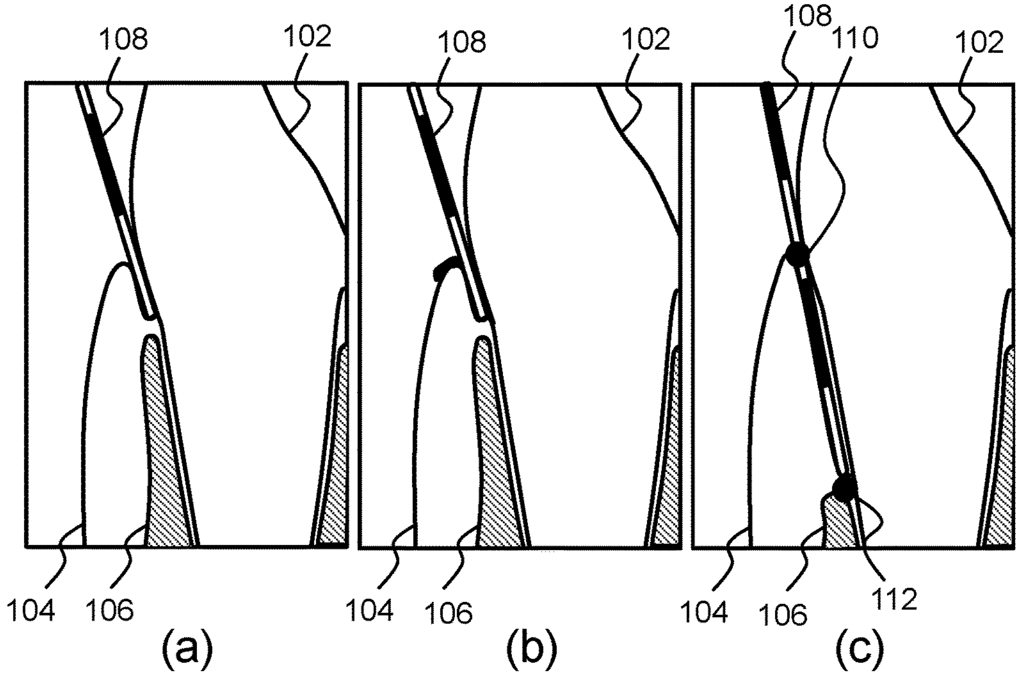
FIG. 1 shows an illustration of a periodontal examination using a probe.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a method for performing a non-invasive periodontal examination on a subject. The method comprises obtaining a first optical image of the surface of an intra-oral area of the subject, the intra-oral area containing at least one tooth and a corresponding gum and obtaining a second image of the intra-oral area of the subject. The second image contains an image of the hard tissue covered by the soft tissue. The hard tissue includes bone and teeth. The method further comprises merging the optical image and the second image into a fused image such that the tooth and part of the gum in the fused image are based on the optical image and wherein any bone in the fused image is based on the second image and estimating the periodontal distance between a soft tissue landmark and a hard tissue landmark for each tooth in the intra-oral area based on the fused image.

FIG. 1 shows an illustration of a periodontal examination using a probe 108. The examination involves inserting a probe 108 with distance markers between the gum 104 and a tooth 102. The maximum distance the probe 108 can be inserted is limited by a bone 106 and is called the probing depth, pocket depth or periodontal distance.

FIG. 1 (*a*) shows probe 108 inserted in healthy gums. FIG. 1 (*b*) shows a probe 108 inserted in gums with gingivitis. FIG. 1 (*c*) shows a probe 108 inserted in gums with periodontitis characterized by loss of jaw bone. Subjects with gingivitis will likely bleed (or cause redness in gum 104) due to the insertion of the probe 108 but the periodontal distance will remain similar to that of healthy gums. However, subjects with periodontitis will have a much larger periodontal distances due to bone loss.

In FIG. 1 (*c*), the periodontal distance is the distance between point 110 and point 112. Point 110 corresponds to a soft tissue landmark and point 112 corresponds to a hard tissue landmark.

The current invention proposes to leverage multimodal image registration fusing digital tooth impression (e.g. optical images from intra-oral scanners) with a second image (e.g. X-ray or ultrasound images) to reconstruct the required anatomical elements needed by a dentist, then automatically assess the periodontal distance non-invasively/remotely, quickly and painlessly. Such method would not disrupt the current practices of the dentists as it does not require additional expertise while maintaining the same look and feel of the traditional probing procedure.

Figure 2:
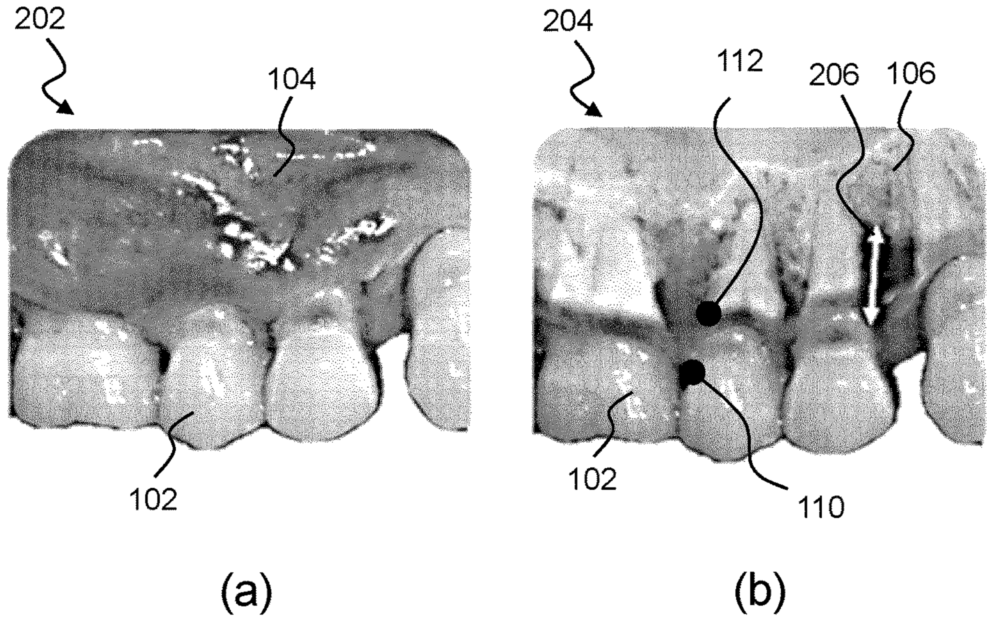
FIG. 2 shows an optical image and a fused image of an intra-oral area.

FIG. 2 shows an optical image 202 and a fused image 204 of an intra-oral area. FIG. 2 (*a*) shows the optical image 202 and FIG. 2 (*b*) shows the fused image 204. The arrow in FIG. 2 (*b*) represents the periodontal distance 206.

In this example, the second image used is an X-ray image of the intra-oral area. The optical image 202 is not able to show the hard tissue landmark 112 and an X-ray image would not be able to show the soft tissue landmark 110. However, the fused image 204 comprises both the soft tissue landmark 110 and the hard tissue landmark 112 and thus the periodontal distance 206 can be estimated solely from the fused image 204.

For visualization purposes, the fused image 204 is shown containing only part of the x-ray image and only part of the optical image 202. The section of the x-ray image containing the hard tissue landmark 112 is shown and the section of the optical image 202 containing the soft tissue landmark 110 is shown. However, the fused image 204 may be the second image superimposed onto the optical image 202 or vice-versa.

The fused image 204 is generated based on existing multimodal image registration which determines a subject-related coordinate system in which all image data from different modalities have a common frame of reference. In one approach, it is proposed to use a marker-based method to fuse the optical image 202 so it matches the second image. Fiducial markers could be placed on the upper edge line of the teeth crown which is an anatomical landmark that can be localized with sufficient accuracy.

Alternatively, the fused image 204 can be generated based on the following steps:

- Upload the optical image 202 and second image into an image processing software;
- Perform image reconstruction using information from the devices used to obtain the optical image 202 and the second image (e.g. known image resolution and pixel size) and superimpose a digital grid to define absolute length scale;
- Apply a boundary tracking segmentation algorithm to the second image to determine a mask or outer boundary geometry;
- Apply a silhouette segmentation algorithm to the optical image 202; and
- Determine a rotation matrix for one of the optical image 202 or the second image (or manually rotate and translate) such that the segmented boundary in the second image matches the segmented silhouette of the optical image 202 (e.g. best fit, agreement in shape, level of conversion, etc.).

Figure 3:
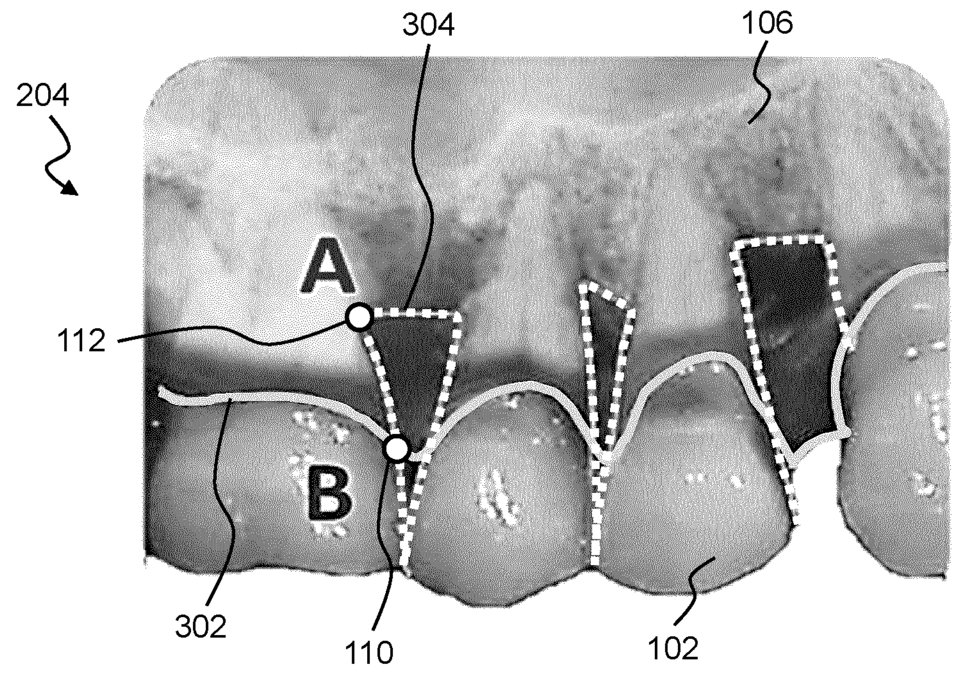
FIG. 3 shows a fused image with a gum-tooth segmentation line and a hard tissue segmentation line.

FIG. 3 shows a fused image 204 with a gum-tooth segmentation line 302 and a hard tissue segmentation line 304. The second image used to generate the fused image 204 is an x-ray image. The hard tissue segmentation line 304 is identified in the X-ray image smoothly separating the black and white regions (i.e. separating the soft tissue from the hard tissue). The optical image 202 is obtained from an intra-oral scanner or a smartphone camera. The gum-tooth segmentation line 302 is identified in the optical image 202 separating the teeth 102 (i.e. teeth crown) and the gum 104.

The hard tissue landmark 112 (point A) is identified in the fused image 204 (or the x-ray image) as the point where the hard tissue segmentation line 304 changes its slope's sign. Point A corresponds to the bone level the probing needle would have touched in the manual procedure.

The soft tissue landmark 110 (point B) is identified as the intersection between the gum-tooth segmentation line 302 and the hard tissue segmentation line 304. The distance between points A and B is thus the estimate of the periodontal distance 206. The same method can thus be iterated on all intersections to cover all the teeth 102 in the intra-oral area.

Alternatively, the soft tissue landmark 110 and the hard tissue landmark 112 could be identified by an interactive pointer tool or in the form of mouse clicks done by a dental practitioner on intersection points. The mouse clicking approach may enable annotating soft and hard tissue structures to train a machine learning algorithm or any other artificial intelligence model to predict gum recession seventy by analysis of an image set. For example, a machine learning algorithm may be trained to predict gum recession severity from the shape of the gum-tooth segmentation line 302 and/or the hard tissue segmentation line 304, or from the shape or size of boundary segmented areas.

In the above examples, high quality intra-oral scanner images are used for the optical image 202. However, a poor quality optical image 202 may be captured by, for example, a phone camera. As a consequence the optical image 202 will be misaligned, rotated, taken from a random distance, not parallel to the teeth 102 etc. Therefore, it may be rather difficult to extract any absolute distances from the optical image 202.

In contrast, x-ray images cannot easily be captured in a home setting and as a consequence will be captured on standardized (medical) equipment. Furthermore, the x-ray images captured are also standardized being taken using either an x-ray sensitive film of a standard size or using a digital capture device with a standardized size.

As the x-ray image is typically standardized, it is proposed to use the known size of the x-ray image to define an absolute length scale for the fused image 204 in the case where a low quality optical image 202 is used. The absolute periodontal distance 206 can thus be estimated based on the absolute length scale. The absolute length scale may be used to superimpose a digital grid into the fused image 204 to define the absolute length scale. A dental practitioner may use the digital grid to manually estimate the periodontal distance 206.

A typical intra-oral area may contain around four pocket sites. Usually, six pocket sites are measured in total for a periodontal examination. Thus, it is proposed to interpolate the periodontal distance 206 of the un-imaged pockets by making use of population data. Specifically, by adding information and trends/averages from datasets (e.g. National Health and Nutrition Examination Survey—NHANES), a reliable estimate of the periodontal distance 206 (i.e. pocket depth) can be provided for all six sites in the mouth, without probing.

For example, if the average of around 10,000 subjects shows that the average pocket depths for the six sites around lower first molar are [6, 5, 6, 7, 6, 6] in mm and the current invention estimates the pocket depths [5, X, 5, 6, Y, 5] in mm, where X and Y are pocket sites which were not measured, then it can be inferred that X=4 and Y=5.

A calibrated digital grid may be used to annotate hard tissue and soft tissue structures. Particularly, the top of the jaw bone 106 and top of interdental gum papilla may be annotated in order to generate training data for a machine learning-based pocket depth estimator.

Boundary segmented optical image 202 and second images may be used as an input for the machine learning algorithm and annotated by clicking on the relevant tissue structures. For example, a dentist can train the machine learning algorithm on-the-fly while doing the digital non-invasive diagnosis and determination of pocket depth using a dashboard or any other user interface. This manual annotation may be done by a dental practitioner when analyzing the optical image 202 or the second image. With this annotation procedure, a suitable machine learning algorithm can be trained with the number/position of clicks on the calibrated digital grid, the shape of the segmentation lines and/or the presence or position of shared points between the optical image 202 and the second image (e.g. intersections between the gum-tooth segmentation line 302 and the hard tissue segmentation line 304).

In a final implementation of the machine learning algorithm, the prediction of the pocket depth is based on the superimposed images and the segmentation lines without the need for having a calibrated digital grid nor a manual read-out of pocket depth.

In addition to estimating the pocket depth, the pocket size/volume may be also estimated using multiple fused images with superimposed calibration digital grid.

Figure 4:
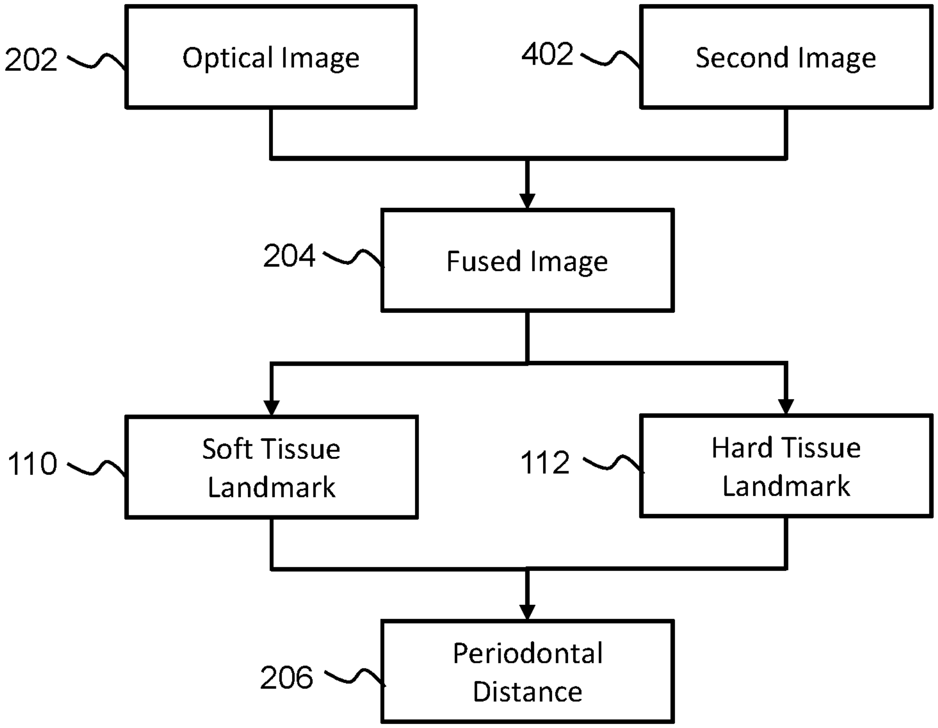
FIG. 4 shows a method of estimating the periodontal distance.

FIG. 4 shows a method of estimating the periodontal distance 206. The method is based on obtaining two points (i.e. soft tissue landmark 110 and hard tissue landmark 112) and estimating the distance separating the two points (i.e. the periodontal distance 206) based on the fusion between an optical image 202 and a second image 402 of an intra-oral area. The fusion of the optical image 202 and the second image 402 is called the fused image 204. The soft tissue landmark 110 can be obtained from the fused image 204 or from the optical image 202. The hard tissue landmark 112 can be obtained from the fused image 204 or from the second image 402.

In summary, the method comprises:

- Obtaining an optical image 202 (e.g. digital impression) of a subject's intra-oral area (e.g. via an intra-oral scanner);
- Obtaining a second image 402 (e.g. 2D or 3D x-ray or ultrasound) of the intra-oral area, the second image 402 containing at least part of the supporting jaw bone 106 structures;
- Fusing the information from the optical image 202 and the second image 402 to augment the optical image 202 (into a fused image 204) with the information about the hard tissue invisible to the naked eye. For example, a superposition of the optical image 202 and the second image 402 can be done using existing technology for hybrid image registration and fusion or using one of the methods previously described; and
- Estimating the periodontal distance 206 based on a soft tissue landmark 110 and a hard tissue landmark 112 in the fused image 204.

Optionally, a graphical and interactive interface is provided which allows the dentist to interact with a simulated 3D model of the subject's oral cavity (i.e. intra-oral area).

The skilled person would be readily capable of developing a processor for carrying out any herein described method. Thus, each step of a flow chart may represent a different action performed by a processor, and may be performed by a respective module of the processing processor.

As discussed above, the system makes use of processor to perform the data processing. The processor can be implemented in numerous ways, with software and/or hardware, to perform the various functions required. The processor typically employs one or more microprocessors that may be programmed using software (e.g., microcode) to perform the required functions. The processor may be implemented as a combination of dedicated hardware to perform some functions and one or more programmed microprocessors and associated circuitry to perform other functions.

Examples of circuitry that may be employed in various embodiments of the present disclosure include, but are not limited to, conventional microprocessors, application specific integrated circuits (ASICs), and field-programmable gate arrays (FPGAs).

In various implementations, the processor may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

The invention claimed is:

1. A method for performing a non-invasive periodontal examination on a subject, the method comprising:

obtaining a first optical image of the surface of an intra-oral area of the subject, the intra-oral area containing at least one tooth and a corresponding gum;

obtaining a second image of the intra-oral area of the subject, wherein the second image contains an image of hard tissue covered by soft tissue and wherein the hard tissue includes bone and teeth;

merging the first optical image and the second image into a fused image such that a soft tissue landmark in the fused image is based on the first optical image and a hard tissue landmark in the fused image is based on the second image;

obtaining the hard tissue landmark based on at least one pixel in the fused image or the second image where a tooth and bone meet;

obtaining the soft tissue landmark based on at least one pixel in the fused image and/or the first optical image where a tooth and gum meet; and estimating the periodontal distance between the soft tissue landmark and the hard tissue landmark for each tooth in the intra-oral area.

2. The method of claim 1, further comprising inferring the periodontal distance between a first soft tissue landmark and a first hard tissue landmark based on at least two different estimated periodontal distances and population data, wherein the first optical image does not contain the first soft tissue landmark and/or the first hard tissue landmark and wherein the population data contains pre-measured patterns of periodontal distances for groups of teeth.

3. The method of claim 1, wherein obtaining the hard tissue landmark is further based on:

segmenting the hard tissue in the second image thereby generating a hard tissue segmentation line; and identifying a sudden change in the gradient of the hard tissue segmentation line, wherein the hard tissue landmark is based on the point where the sudden change in gradient occurs.

4. The method of claim 1, wherein obtaining the hard tissue landmark is further based on one of:

receiving the position of the hard tissue landmark from a user interface; or inputting the fused image and/or the second image into a machine learning algorithm trained to identify the hard tissue landmark.

5. The method of claim 1, wherein obtaining the soft tissue landmark is further based on:

segmenting the hard tissue in the second image thereby generating a hard tissue segmentation line;

segmenting the teeth and gums in the first optical image thereby generating a gum-tooth segmentation line; and determining the soft tissue landmark based on where the gum-tooth segmentation line intersects the hard tissue segmentation line.

6. The method of claim 1, wherein obtaining the soft tissue landmark is further based on one of:

receiving the position of the soft tissue landmark from a user interface; or inputting the fused image and/or the first optical image into a machine learning algorithm trained to identify the soft tissue landmark.

7. The method of claim 1, wherein merging the first optical image and the second image into a fused image is based on:

identifying at least two markers in the second image and in the first optical image;

mapping the second image to the optical image based on the identified markers; and combining the second image and the first optical image to generate the fused image.

8. The method of claim 1, wherein merging the first optical image and the second image into a fused image is based on:

determining a first outer geometry of the teeth in the first optical image;

determining a second outer geometry of the teeth in the second image;

mapping the second image or the first optical image such that the first outer geometry coincides with the second outer geometry;

combining the second image and the first optical image to generate the fused image.

9. The method of claim 1, wherein the second image is generated based on a known scale and wherein estimating the periodontal distance is based on the known scale.

10. The method of claim 9, further comprising superimposing a digital grid onto the fused image, wherein the digital grid is generated based on the known scale and defines absolute length within the fused image.

11. A non-transitory computer program product comprising a storage medium storing computer program code which, when executed on a computing device having a processing system, cause the processing system to perform all of the steps of the method according to claim 1.

12. A system for performing a non-invasive periodontal examination on a subject, the system comprising a processor configured to:

obtain a first optical image of the surface of an intra-oral area of the subject, the intra-oral area containing at least one tooth and a corresponding gum;

obtain a second image of the intra-oral area of the subject, wherein the second image contains an image of hard tissue covered by soft tissue and wherein the hard tissue includes bone and teeth;

merge the first optical image and the second image into a fused image such that a soft tissue landmark in the fused image is based on the first optical image and a hard tissue landmark in the fused image is based on the second image;

obtain the hard tissue landmark based on at least one pixel in the fused image or the second image where a tooth and bone meet;

obtain the soft tissue landmark based on at least one pixel in the fused image and/or the first optical image where a tooth and gum meet; and estimate the periodontal distance between the soft tissue landmark and the hard tissue landmark for each tooth in the intra-oral area.

13. The system of claim 12, wherein the processor is further configured to infer the periodontal distance between a first soft tissue landmark and a first hard tissue landmark based on at least two different estimated periodontal distances and population data, wherein the first optical image does not contain the first soft tissue landmark and/or the first hard tissue landmark and wherein the population data contains pre-measured patterns of periodontal distances for groups of teeth.

* * * * *